(12) United States Patent
Harasym et al.

(10) Patent No.: US 11,584,157 B2
(45) Date of Patent: Feb. 21, 2023

(54) WHEEL TRIM RETENTION CAP

(71) Applicant: Tesla, Inc., Austin, TX (US)

(72) Inventors: Stephen Alexander Harasym, Mountain View, CA (US); Brian Lee Doorlag, Pleasanton, CA (US)

(73) Assignee: Tesla, Inc., Austin, TX (US)

( * ) Notice: Subject to any disclaimer, the term of this patent is extended or adjusted under 35 U.S.C. 154(b) by 543 days.

(21) Appl. No.: 16/569,461

(22) Filed: Sep. 12, 2019

(65) Prior Publication Data

US 2020/0101790 A1 Apr. 2, 2020

Related U.S. Application Data

(60) Provisional application No. 62/730,781, filed on Sep. 13, 2018.

(51) Int. Cl.
| | | |
|---|---|---|
| *B60B 7/08* | (2006.01) | |
| *B60B 7/00* | (2006.01) | |
| *B60B 7/06* | (2006.01) | |
| *B60B 7/04* | (2006.01) | |

(52) U.S. Cl.
CPC ............. *B60B 7/08* (2013.01); *B60B 7/0013* (2013.01); *B60B 7/04* (2013.01); *B60B 7/066* (2013.01); *B60B 2360/32* (2013.01)

(58) Field of Classification Search
CPC ........... B60B 7/08; B60B 7/0013; B60B 7/04; B60B 7/14; B60B 7/066; B60B 2360/32
See application file for complete search history.

(56) References Cited

U.S. PATENT DOCUMENTS

| | | | | |
|---|---|---|---|---|
| 7,416,260 | B1* | 8/2008 | Cuevas | B60B 7/08 |
| | | | | 301/37.11 |
| 8,851,577 | B2* | 10/2014 | Onishi | B60B 7/08 |
| | | | | 301/37.35 |
| 9,393,833 | B2* | 7/2016 | Vickers | B60B 7/06 |
| 9,821,599 | B2* | 11/2017 | Wang | B60B 7/066 |
| 2005/0073191 | A1* | 4/2005 | Gerard | B60B 5/02 |
| | | | | 301/37.101 |
| 2011/0062771 | A1* | 3/2011 | Capuzzi | B60B 7/0013 |
| | | | | 301/108.1 |
| 2012/0319461 | A1* | 12/2012 | Burguete | B60B 27/0073 |
| | | | | 301/106 |
| 2013/0015698 | A1* | 1/2013 | Butler | B60B 7/0013 |
| | | | | 301/37.29 |
| 2017/0341463 | A1* | 11/2017 | Takeda | B60B 7/04 |
| 2019/0092089 | A1* | 3/2019 | Wren | B60B 7/04 |

\* cited by examiner

*Primary Examiner* — Scott A Browne
(74) *Attorney, Agent, or Firm* — Knobbe, Martens, Olson & Bear, LLP

(57) ABSTRACT

A cap for retaining a wheel trim with a wheel includes a body portion which slides inside a central opening defined by a hub portion of the wheel trim. The body portion has a first end and a second end. The cap includes at least one engagement portion coupled to the body portion. The at least one engagement portion engages with an internal wall of the hub portion. The cap includes at least one retaining tab coupled to the body portion towards the second end of the body portion. The at least one retaining tab extends radially outwards from the second end of the body portion. The cap further includes a holding portion coupled to the body portion towards the first end. The holding portion extends radially outwards from the body portion such that the holding portion abuts a disc portion of the wheel trim.

18 Claims, 7 Drawing Sheets

WHEEL TRIM RETENTION CAP

CROSS-REFERENCE TO RELATED APPLICATIONS

This application claims priority to U.S. Prov. App. No. 62/730,781, filed Sep. 13, 2018 and entitled "WHEEL TRIM RETENTION CAP", which is hereby incorporated herein by reference in its entirety.

Any and all applications for which a foreign or domestic priority claim is identified in the Application Data Sheet as filed with the present application are hereby incorporated by reference in their entirety under 37 CFR 1.57.

TECHNICAL FIELD

The present disclosure generally relates to a wheel trim coupled to a wheel of a vehicle. More specifically, the present disclosure relates to a retention cap for retaining wheel trim with the wheel.

BACKGROUND

Wheel trim systems are widely used on vehicles to create an aesthetic appearance on vehicle wheels, and in some cases provide improvements to the aerodynamics of the vehicles. The wheel trim also protects the wheels from water, road salt and other environmental factors, which may affect corrosion of the wheels.

Numerous methods and systems of releasably securing wheel trims to vehicle wheels are known. One common method relies upon securing elements which are located circumferentially about the periphery of the wheel trim. In such methods, the securing elements are engaged in a press-fit manner to a peripheral surface of rim of the wheel. To remove the wheel trim, an axially outward force is applied to the wheel trim to overcome the axial restraint upon the rim created by the securing elements. However, one of the concerns with such securing systems is the need to optimize the retention force. If retention force is too low, the wheel trim may come off during normal operation of the vehicle. If retention force is too high, it may be difficult to remove wheel trim easily without damaging the wheel trim. It is desirable to provide a safe and secure wheel trim retention system that allows for ease of attachment and removal of the wheel trim. Preferably, the wheel trim should also be removable without a tool.

SUMMARY

The present disclosure describes a cap for retaining a wheel trim with a wheel of a vehicle. Wheel trim includes a hub portion which defines a central opening. Wheel trim further includes a disc portion extending radially outwards from the hub portion. Cap includes a body portion which slides inside central opening. Body portion extends between a first end and a second end. Cap includes at least one engagement portion coupled to body portion. At least one engagement portion engages with an internal wall of hub portion. Engagement portion includes a clip which engages with a protrusion on internal wall of hub portion. Cap further includes a holding portion coupled to body portion towards first end of body portion. Holding portion extends radially outwards from body portion such that holding portion is adapted to abut disc portion when body portion slides inside central opening. Cap may be made of a plastic material.

In embodiments, cap further includes at least one retaining tab which engages with retaining legs of hub portion. Cap and hub portion may include any number of pairs of retaining tabs and retaining legs, for example three, four, five, eight, etc. Cap can be rotated or twisted in corresponding angular ranges to engage retaining tabs with retaining legs. In embodiments, present disclosure further describes a wheel assembly having the cap the retaining wheel trim with the wheel.

Figure 1:
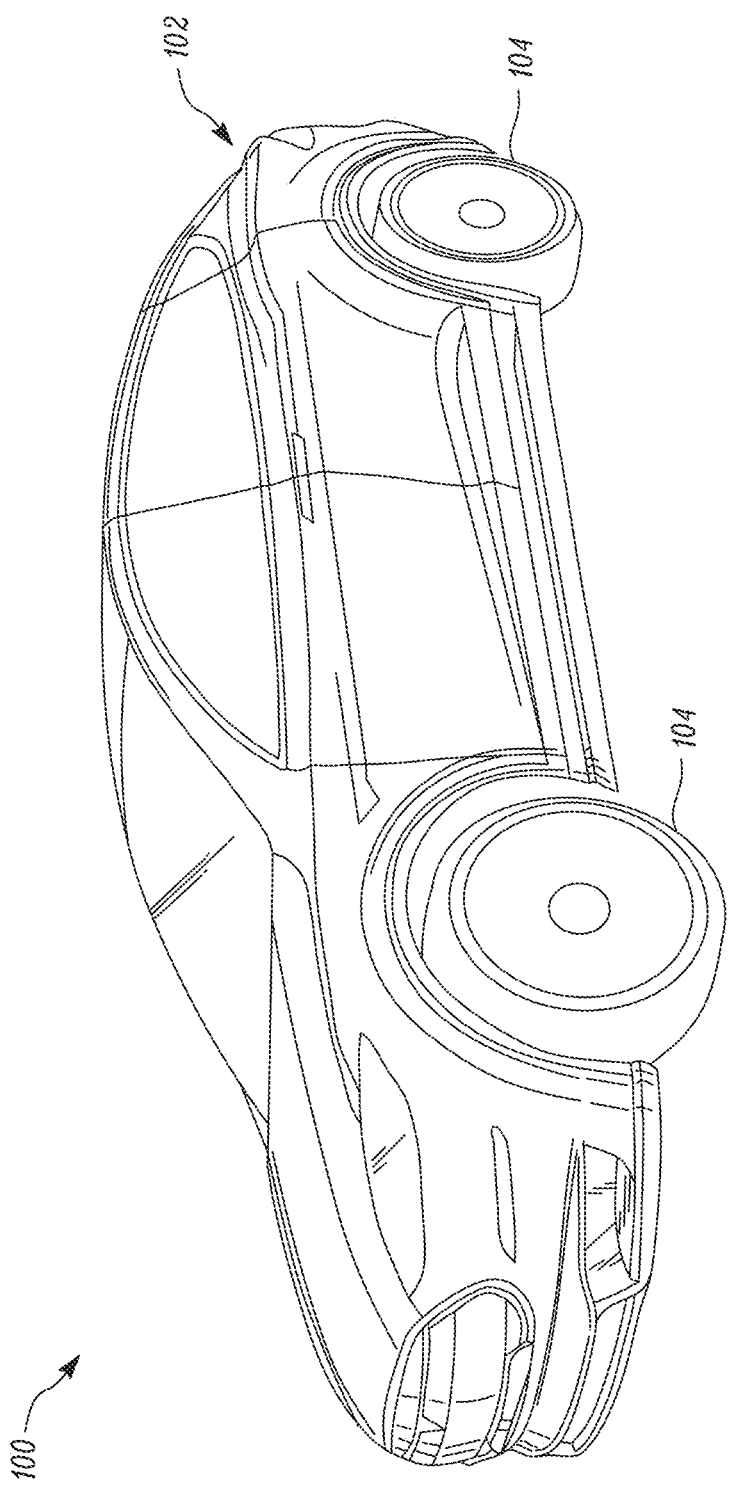
FIG. 1 illustrates an exemplary vehicle, according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

FIG. 1 illustrates an exemplary vehicle 100. Vehicle 100 may be an electric vehicle, a hybrid vehicle, or may be driven by conventional fuels etc. The present disclosure is not limited by type of vehicle in any manner. Vehicle 100 includes a body 102 supported over four wheels 104. Vehicle 100 may include any other number of wheels 104 as well based on type of application for which vehicle 100 is to be used. Wheels 104 may be structurally identical to each other or may differ from each other in some structural aspects. For example, two front wheels 104 may be identical to each other, and two rear wheels 104 may be identical to each other.

Figure 2:
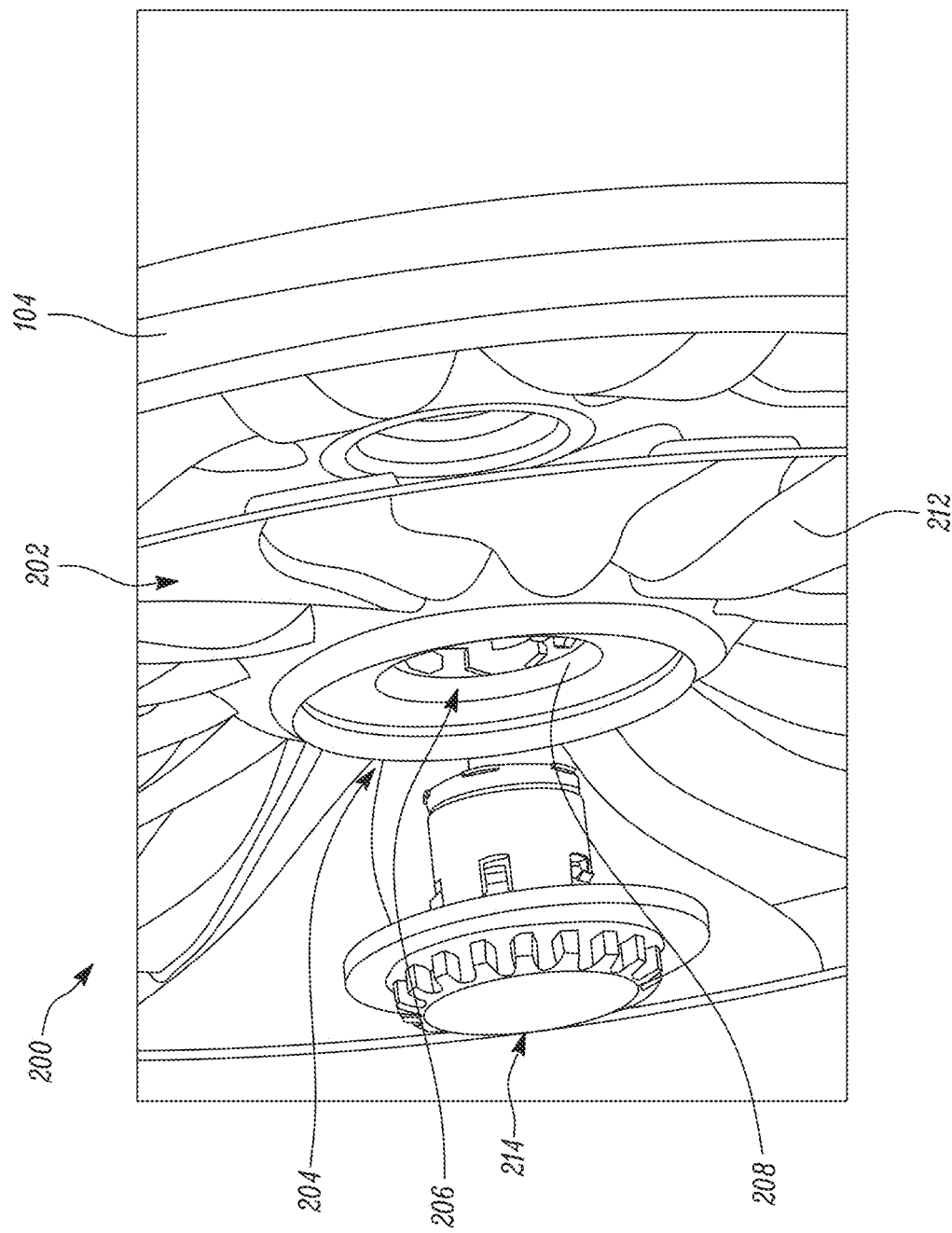
FIG. 2 illustrates a wheel assembly for the vehicle shown in FIG. 1, according to certain embodiments of the invention.

FIG. 2 illustrates a wheel assembly 200 for vehicle 100 to be used with any of four wheels 104 of vehicle 100. Wheel assembly 200 includes wheel 104, and a wheel trim 202 coupled to wheel 104. Wheel trim 202 covers central portion of wheel 104 to prevent accumulation of dirt and moisture, or any other such functions. Wheel trim 202 includes a hub portion 204 which defines a central opening 206. Central opening 206 is defined by an internal wall 208 of wheel trim 202. Internal wall 208 has a substantially hollow cylindrical shape which may allow inserting another component in central opening 206. Internal wall 208 further includes a protrusion 210 (shown in FIG. 4) extending circumferentially across internal wall 208. Wheel trim 202 further includes a disc portion 212 which extends radially outwards from hub portion 204. Wheel trim 202 may be made up of a plastic material, polymer material or any other suitable material which may be applicable with various aspects of present disclosure. Wheel trim 202 is retained with wheel 104 through a cap 214.

Figure 3:
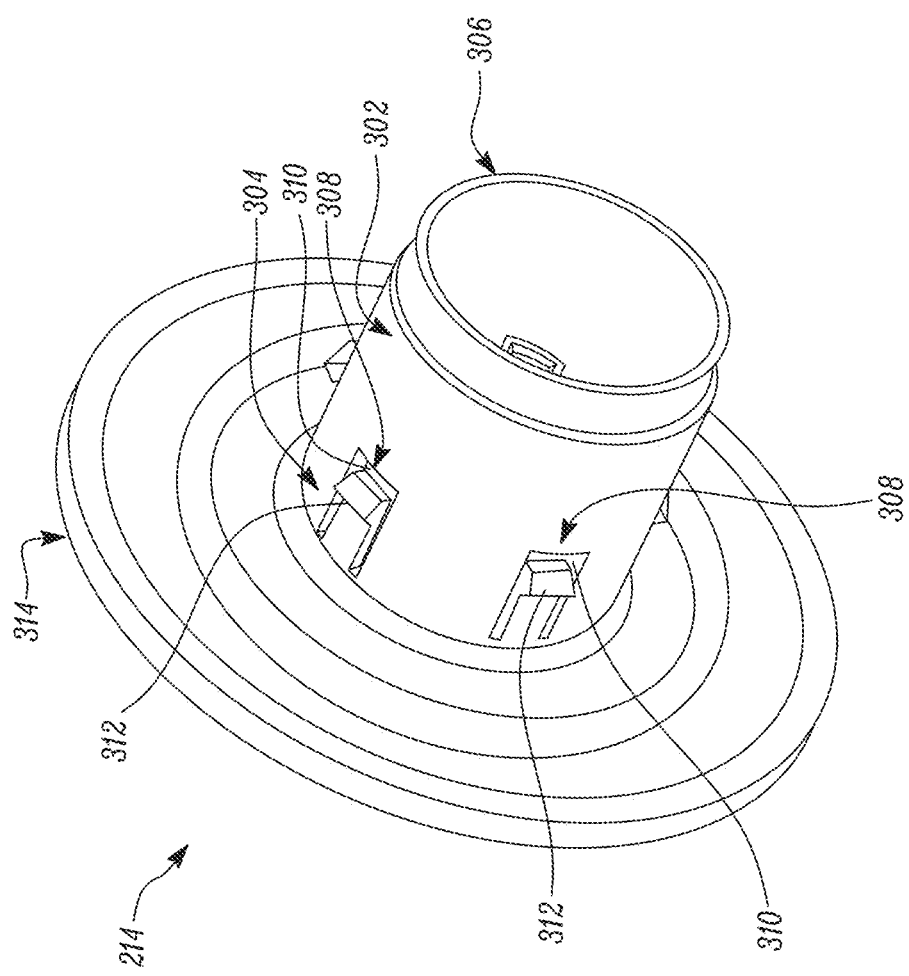
FIG. 3 illustrates an isometric view of a cap for retaining wheel trim with wheel, according to certain embodiments of the invention.

FIG. 3 illustrates cap 214 for retaining wheel trim 202 with wheel 104, according to an embodiment of present disclosure. Cap 214 includes a body portion 302. Body portion 302 is illustrated as having a substantially cylindrical structure. However, body portion 302 may have any other suitable shape as well which may be applicable with various aspects of present disclosure. Body portion 302 has a first end 304 and a second end 306. Body portion 302 may slide inside central opening 206 defined by hub portion 204. Body portion 302 may slide inside central opening 206 such that second end 306 of body portion 302 slides inside central opening 206, and first end 304 remains outside of central opening 206.

Cap 214 further includes at least one engagement portion 308 coupled to body portion 302. Engagement portion 308 is illustrated as a clip. However, engagement portion 308 may be any other type of structural feature as well which may be suitable for application with various aspects of present disclosure. Further, cap 214 may include any number of engagement portions 308 coupled to body portion 302. In certain embodiments, cap 214 includes three engagement portions 308. In certain embodiments, cap 214 includes four engagement portions 308. In certain embodiments, cap 214 includes eight engagement portions 308.

Engagement portion 308 has a structure such that engagement portion 308 may slide comparatively easily past protrusion 210 when body portion 302 is sliding inside central opening 206. However, engagement portion 308 is also designed in a manner which prevents inadvertent disengaging of engagement portion 308 with internal wall 208. Engagement portion 308 includes a recess 310 defined in body portion 302. A resilient clip 312 is coupled to body portion 302 such that on inserting cap 214 inside central opening 206, pressure is applied by internal wall 208 of hub portion 204 on resilient clip 312. Resilient clip 312 dips inside recess 310 and comes back to original position after sliding past protrusion 210 on internal wall 208. Cap 214 further includes a holding portion 314 coupled to body portion 302 towards first end 304 of body portion 302. Holding portion 314 extends radially outwards from body portion 302. When cap 214 slides inside central opening 206, holding portion 314 remains outside of central opening 206 and abuts with disc portion 212 of wheel trim 202. Holding portion 314 may be used for holding cap 214 while inserting cap 214 inside central opening 206 during assembling of wheel trim 202 with wheel 104.

Figure 4:
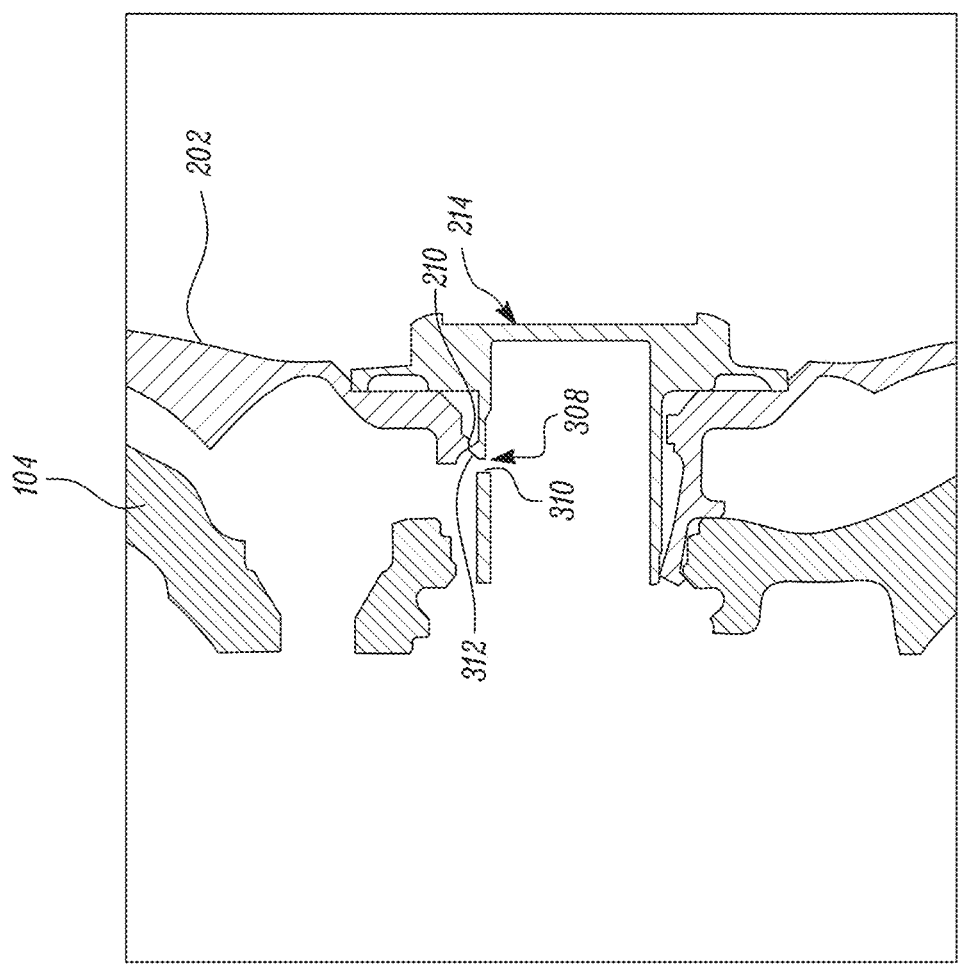
FIG. 4 illustrates a cross-sectional view of the wheel assembly, according to certain embodiments of the invention.

FIG. 4 illustrates a sectional view of wheel assembly 200 with cap 214 retaining wheel trim 202 with wheel 104. When cap 214 slides inside central opening 206, engagement portion 308 engages protrusion 210 on internal wall 208. Resilient clip 312 of engagement portion 308 dips inside recess 310, and thus cap 214 slides past protrusion 210. However, after cap 214 slides past protrusion 210, resilient clip 312 comes back to original position, and prevents sliding of cap 214 outwards from central opening 206 by abutting against protrusion 210. This allows retaining of wheel trim 202 with wheel 104 by preventing retaining legs 504 deflecting radially inwards from disengaging wheel 104.

Figure 5:
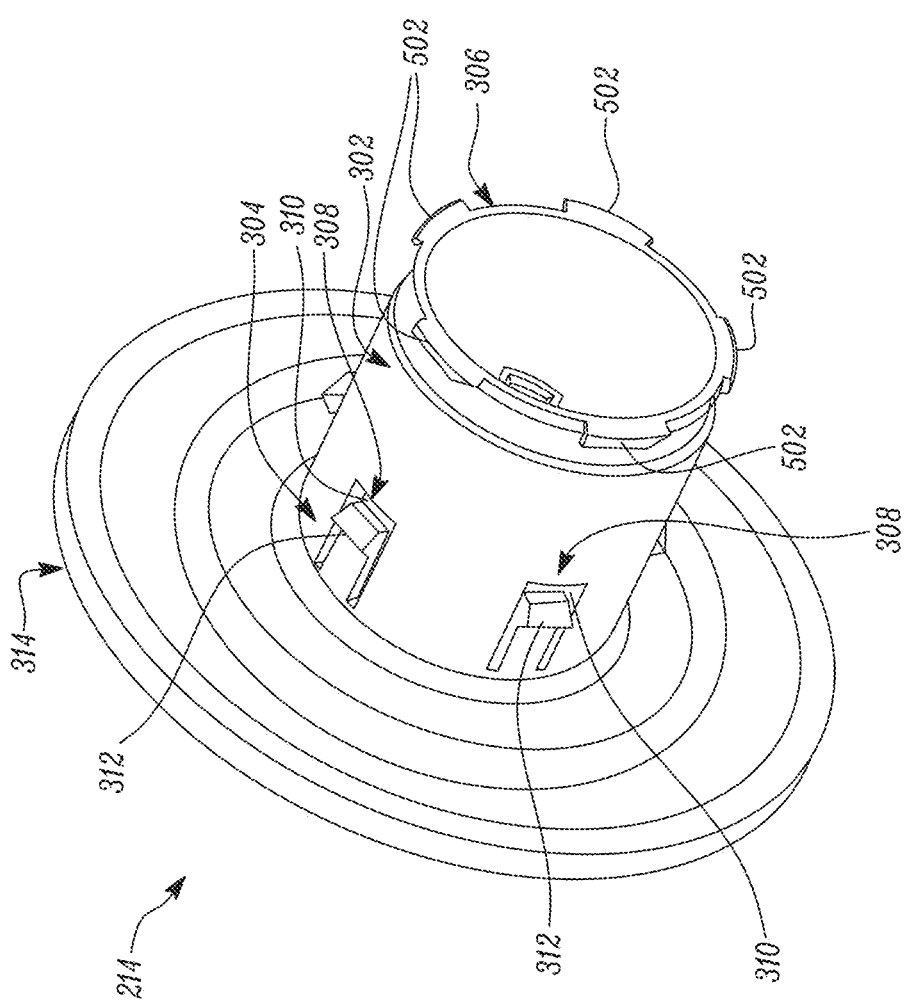
FIG. 5 illustrates another isometric view of the cap for retaining wheel trim with wheel, according to certain embodiments of the invention.

FIG. 5 illustrates another embodiment of present disclosure. Cap 214 further includes at least one retaining tab 502 coupled to the body portion 302 towards the second end 306 of the body portion 302. At least one retaining tab 502 extends radially outwards from the second end 306 of the body portion 302 such that retaining tab 502 is substantially orthogonal relative to second end 306 of body portion 302. In the illustrated embodiment, at least one retaining tab 502 includes five retaining tabs 502. The retaining tabs 502 engage with internal wall 208 of hub portion 204. More specifically, retaining tabs 502 engage with retaining legs 504 (shown in FIG. 6) of hub portion 204. Internal wall 208 of hub portion 204 is designed such that multiple retaining legs 504 are provided for engaging with retaining tabs 502.

Figure 6B:
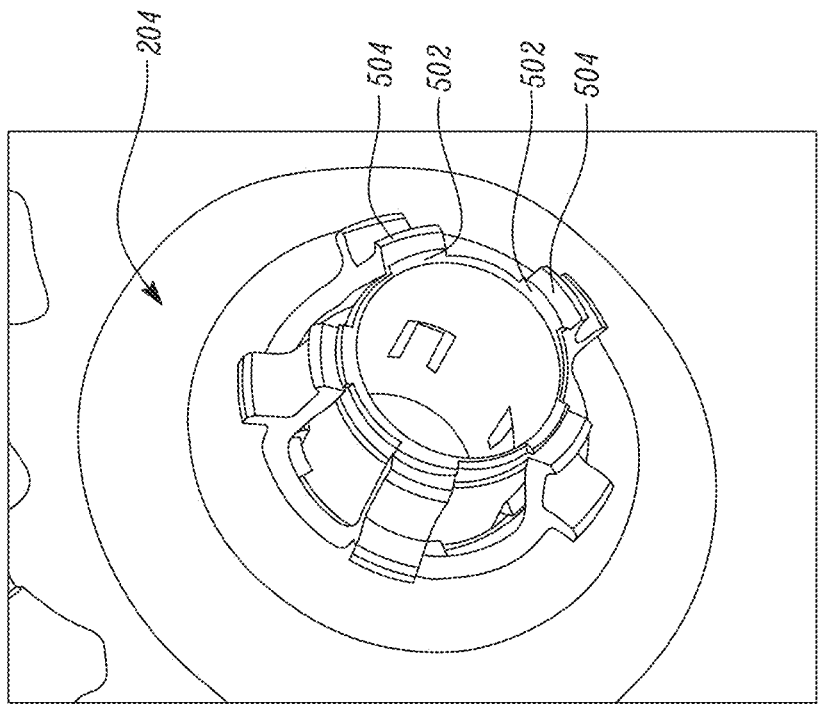
FIG. 6B illustrates another isometric view of the cap assembled with wheel trim with retaining tabs aligned with retaining legs, according to certain embodiments of the invention.
Figure 6A:
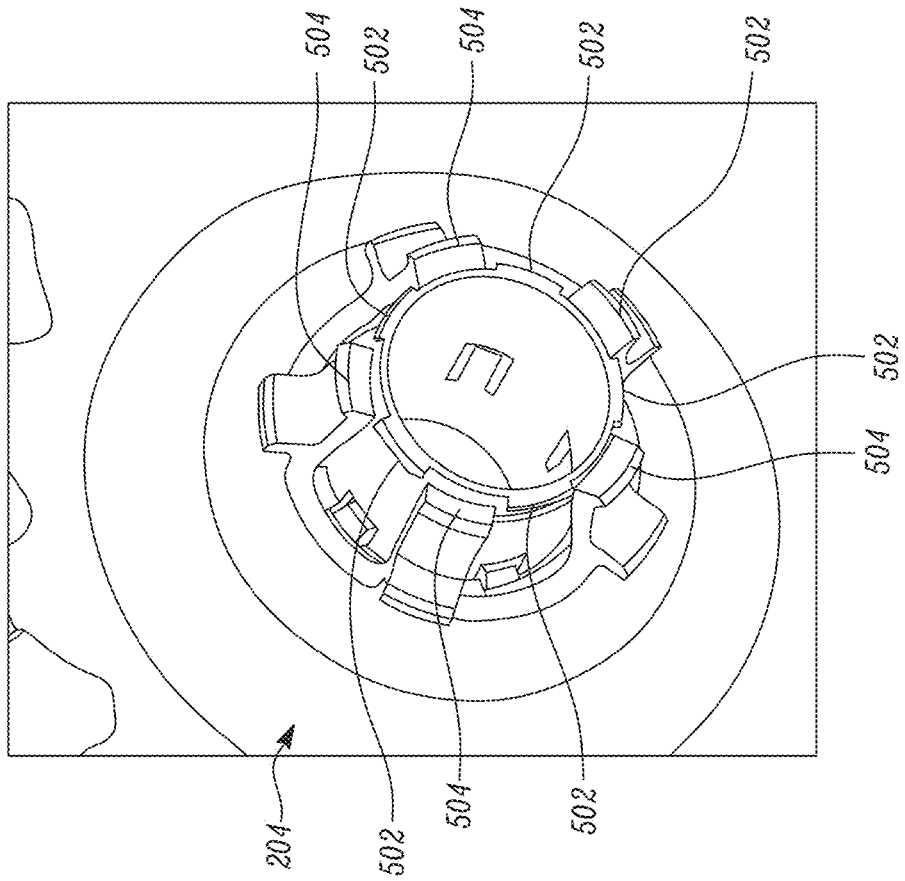
FIG. 6A illustrates another isometric view of the cap assembled with wheel trim with retaining tabs not aligned with retaining legs, according to certain embodiments of the invention.

Referring to FIGS. 6A and 6B, hub portion 204 includes five retaining legs 504 corresponding to five retaining tabs 502 of cap 214. When cap 214 slides inside central opening 206, cap 214 may be twisted or rotated such that retaining tabs 502 align with retaining legs 504. FIG. 6A shows retaining tabs 502 and retaining legs 504 not aligned with each other. FIG. 6B shows retaining tabs 502 and retaining legs aligned with each other. With combined reference to FIGS. 6A and 6B, as cap 214 has five pairs of retaining tabs 502 and retaining legs 504, cap 214 may need to be rotated in an angular range of 0 to 72 degrees. Now, after alignment of retaining tabs 502 and retaining legs 504, if cap 214 inadvertently begins to slide outside of central opening 206, engagement of retaining tabs 502 and retaining legs 504 gets further strengthened and retains the wheel trim 202 with wheel 104 and cap 214 with hub portion 204.

In certain embodiments, the cap 214 may include three retaining tabs 502 and wheel trim 202 may include three corresponding retaining legs 504. As there are three pairs of retaining tabs 502 and retaining legs 504, cap 214 may need to be rotated in an angular range of 0 to 120 degrees to align retaining tabs 502 with retaining legs 504. In certain embodiments, the cap 214 may include four retaining tabs 502 and wheel trim 202 may include four corresponding retaining legs 504. As there are four pairs of retaining tabs 502 and retaining legs 504, cap 214 may need to be rotated in an angular range of 0 to 90 degrees to align retaining tabs 502 with retaining legs 504. In certain embodiments, the cap 214 may include eight retaining tabs 502 and wheel trim 202 may include eight corresponding retaining legs 504. As there are eight pairs of retaining tabs 502 and retaining legs 504, cap 214 may need to be rotated in an angular range of 0 to 45 degrees to align retaining tabs 502 with retaining legs 504. The present disclosure is not limited by number of retaining tabs 502 and retaining legs 504 in any manner, and may include any number of such pairs to suit the need of application for which wheel assembly 200 is being used.

As body portion 302 extends past engagement portion 308 to second end 306 of body portion 302, radial force may also be exerted by body portion 302 on retaining legs 504 of wheel trim 202 in this region. Body portion 302 between engagement portion 308 and second end 306 may have high radial stiffness to apply pressure on retaining legs 504 of hub portion 204. This may allow further engagement between cap 214 and wheel trim 202.

Figure 7:
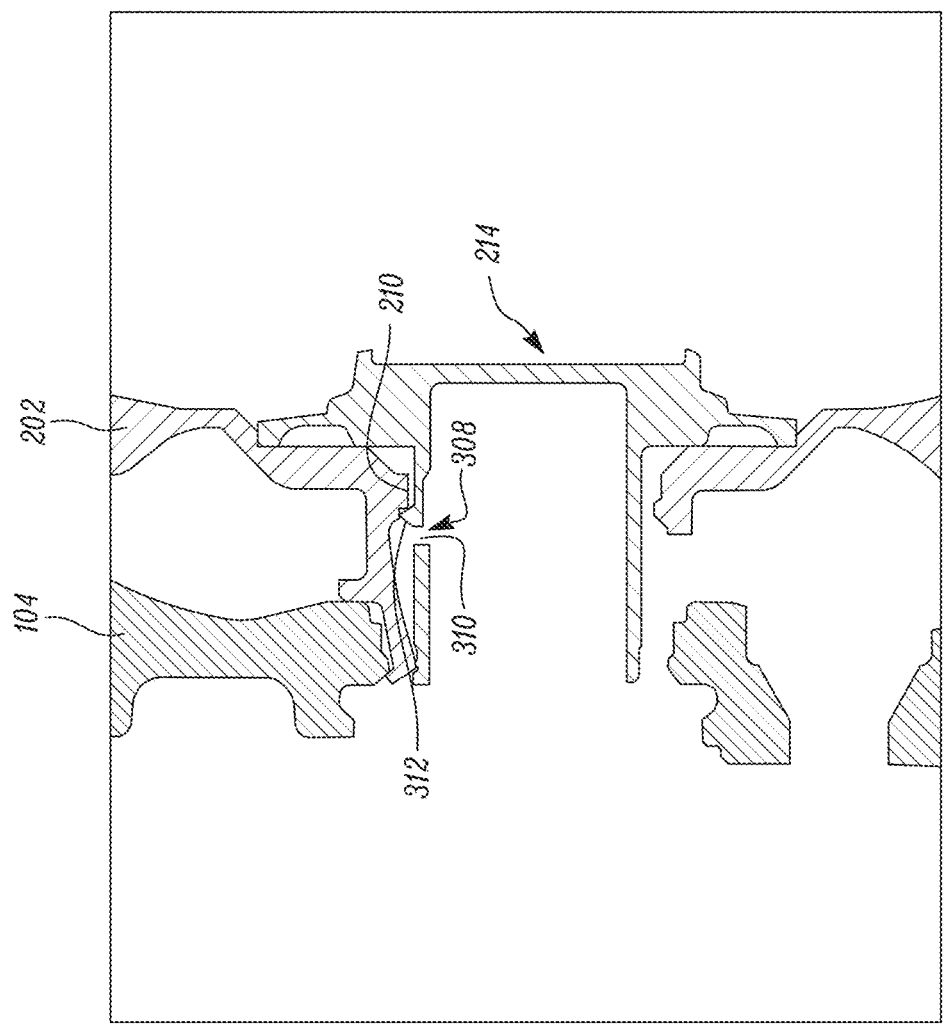
FIG. 7 illustrates another cross-sectional view of the wheel assembly, according to certain embodiments of the invention.

FIG. 7 shows a cross-sectional view of wheel assembly 200 corresponding to cap 214 shown in FIG. 5. Step size of engagement portion 308 is increased compared to embodiment shown in FIGS. 3 and 4. This allows additional gripping force for retention of wheel trim 202 with wheel 104. Further, retaining tabs 502 of cap 214 make sure wheel trim 202 is pulled further inwards when retaining legs 504 start to disengage providing better structural coupling between wheel trim 202 and wheel 104. The structural design described in present disclosure allows a material of lesser stiffness to be used for manufacturing wheel trim 202, as function of retention of wheel trim 202 with wheel 104 is taken up by cap 214. Cap 214 may be designed with a material of higher stiffness to take up stresses involved in retaining functionality. Thus, it may be easier to disengage wheel trim 202 when required without causing any damage to wheel trim 202 or wheel 104.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed wheel trim retention cap. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A cap for mounting a wheel trim to a wheel, wherein the wheel trim comprises a plurality of inwardly deflecting retaining legs, and wherein the wheel trim has a hub portion defining a central opening and a disc portion extending radially outwards from the hub portion, the cap comprising:
    a body portion adapted to slide inside the central opening, wherein the body portion extends between a first end and a second end, the body portion being sized to deflect the plurality of inwardly deflecting retaining legs radially outward when mounted inside the central opening so that the retaining legs engage with the wheel;
    at least one engagement portion coupled to the body portion, wherein the at least one engagement portion is adapted to engage with an internal wall of the hub portion; and
    a holding portion coupled to the body portion towards the first end, wherein the holding portion extends radially outwards from the body portion such that the holding portion is adapted to abut the disc portion when the body portion is slid inside the central opening.

2. The cap of claim 1, wherein the at least one engagement portion includes a clip which engages with a protrusion extending from the internal wall of the hub portion.

3. The cap of claim 1, wherein the cap comprises of a plastic material.

4. A cap for mounting a wheel trim to a wheel, wherein the wheel trim comprises a plurality of inwardly deflecting retaining legs, and wherein the wheel trim has a hub portion defining a central opening and a disc portion extending radially outwards from the hub portion, the cap comprising:
    a body portion adapted to slide inside the central opening, wherein the body portion extends between a first end and a second end, the body portion being sized to deflect the plurality of retaining legs radially outwards when mounted inside the central opening so that the retaining legs engage with the wheel;
    at least one engagement portion coupled to the body portion, wherein the at least one engagement portion is adapted to engage with an internal wall of the hub portion;
    at least one retaining tab coupled to the body portion at the second end of the body portion, wherein the at least one retaining tab extends radially outwards from the second end of the body portion and is configured to engage with the retaining legs to prevent their radially inward movement; and
    a holding portion coupled to the body portion towards the first end, wherein the holding portion extends radially outwards from the body portion such that the holding portion is adapted to abut the disc portion when the body portion is slid inside the central opening.

5. The cap of claim 4, wherein the at least one retaining tab includes three retaining tabs and the plurality of retaining legs includes three retaining legs corresponding to the three retaining tabs, such that the cap can be rotated in an angular range of 0 to 120 degrees to engage the retaining tabs with the respective retaining legs.

6. The cap of claim 4, wherein the at least one retaining tab includes four retaining tabs and the plurality of retaining legs includes four retaining legs corresponding to the four retaining tabs, such that the cap can be rotated in an angular range of 0 to 90 degrees to engage the retaining tabs with the respective retaining legs.

7. The cap of claim 4, wherein the at least one retaining tab includes five retaining tabs and the plurality of retaining legs includes five retaining legs corresponding to the five retaining tabs, such that the cap can be rotated in an angular range of 0 to 72 degrees to engage the retaining tabs with the respective retaining legs.

8. The cap of claim 4, wherein the at least one retaining tab includes eight retaining tabs and the plurality of retaining legs includes eight retaining legs corresponding to the eight retaining tabs, such that the cap can be rotated in an angular range of 0 to 45 degrees to engage the retaining tabs with the respective retaining legs.

9. The cap of claim 4, wherein the at least one engagement portion includes a clip which engages with a protrusion extending from the internal wall of the hub portion.

10. The cap of claim 4, wherein the cap comprises of a plastic material.

11. A wheel assembly of a vehicle comprising:
a wheel trim adapted to be coupled to a wheel, the wheel trim including:
a hub portion defining a central opening and having a plurality of retaining legs that deflect radially inwards;
a disc portion extending radially outwards from the hub portion;
a cap adapted to mount the wheel trim with the wheel by deflecting the plurality of retaining legs outwards when engaged to the wheel trim, the cap comprising:
a body portion adapted to slide inside the central opening, wherein the body portion extends between a first end and a second end, the body portion being sized to deflect the plurality of retaining legs radially outwards when mounted inside the central opening so that the retaining legs engage with the wheel;
at least one engagement portion coupled to the body portion, wherein the at least one engagement portion is adapted to engage with an internal wall of the hub portion; and
a holding portion coupled to the body portion towards the first end, wherein the holding portion extends radially outwards from the body portion such that the holding portion is adapted to abut the disc portion when the body portion is slid inside the central opening.

12. The wheel assembly of claim 11, wherein the cap further comprises:
at least one retaining tab coupled to the body portion at the second end of the body portion, wherein the at least one retaining tab extends radially outwards from the second end of the body portion and is configured to engage with the retaining legs to prevent their radially inward movement.

13. The wheel assembly of claim 12, wherein the at least one retaining tab includes three retaining tabs and the plurality of retaining legs includes three retaining legs corresponding to the three retaining tabs, such that the cap can be rotated in an angular range of 0 to 120 degrees to engage the retaining tabs with the respective retaining legs.

14. The wheel assembly of claim 12, wherein the at least one retaining tab includes four retaining tabs and the plurality of retaining legs includes four retaining legs corresponding to the four retaining tabs, such that the cap can be rotated in an angular range of 0 to 90 degrees to engage the retaining tabs with the respective retaining legs.

15. The wheel assembly of claim 12, wherein the at least one retaining tab includes five retaining tabs and the plurality of retaining legs includes five retaining legs corresponding to the five retaining tabs, such that the cap can be rotated in an angular range of 0 to 72 degrees to engage the retaining tabs with the respective retaining legs.

16. The wheel assembly of claim 12, wherein the at least one retaining tab includes eight retaining tabs and the plurality of retaining legs includes eight retaining legs corresponding to the eight retaining tabs, such that the cap can be rotated in an angular of 0 to 45 degrees to engage the retaining tabs with the respective retaining legs.

17. The wheel assembly of claim 11, wherein the at least one engagement portion includes a clip which engages with a protrusion extending from the internal wall of the hub portion.

18. The wheel assembly of claim 11, wherein the cap comprises of a plastic material.

\* \* \* \* \*

UNITED STATES PATENT AND TRADEMARK OFFICE
CERTIFICATE OF CORRECTION

| | | |
|---|---|---|
| PATENT NO. | : 11,584,157 B2 | Page 1 of 1 |
| APPLICATION NO. | : 16/569461 | |
| DATED | : February 21, 2023 | |
| INVENTOR(S) | : Stephen Alexander Harasym | |

It is certified that error appears in the above-identified patent and that said Letters Patent is hereby corrected as shown below:

In the Claims

In Column 8, Claim 16, Line 37, after "angular" insert --range--.

Signed and Sealed this
Twenty-fifth Day of July, 2023

Katherine Kelly Vidal
*Director of the United States Patent and Trademark Office*